United States Patent [19]

Ritzerfeld

[11] 4,057,348

[45] Nov. 8, 1977

[54] COPYING APPARATUS

[76] Inventor: Gerhard Ritzerfeld, Schorlemer Allee 14, 100 Berlin 33, Germany

[21] Appl. No.: 592,846

[22] Filed: July 3, 1975

[30] Foreign Application Priority Data

July 4, 1974 Germany .............................. 2432424
Feb. 13, 1975 Germany ............................. 2506127

[51] Int. Cl.² ............................................. G03B 27/62
[52] U.S. Cl. ........................................ 355/75; 355/43; 355/49; 355/54
[58] Field of Search ................................... 355/47–49, 355/53, 54, 75, 40, 43

[56] References Cited

U.S. PATENT DOCUMENTS

| | | | |
|---|---|---|---|
| 3,220,301 | 11/1965 | Koonz et al. | 355/40 |
| 3,606,546 | 9/1971 | Dudley | 355/75 X |
| 3,612,684 | 10/1971 | Jones et al. | 355/40 |
| 3,722,991 | 3/1973 | Edhlund | 355/40 X |
| 3,751,153 | 8/1973 | Naito | 355/40 X |
| 3,771,863 | 11/1973 | Muka | 355/40 X |
| 3,907,426 | 9/1975 | Goodliffe | 355/53 |

Primary Examiner—Richard A. Wintercorn
Attorney, Agent, or Firm—Michael J. Striker

[57] ABSTRACT

An electrostatic or xerographic copying apparatus of the type having a transparent support on which an original is placed face down so as to be copied through the support, has a first arrangement capable of holding first members which form with one another a gap, and a second arrangement capable of holding an original which overlies the first members so that increments of its face are visible through this gap. An arrangement is provided for shifting the second arrangement relative to the first arrangement so that different increments of the original can be exposed in the gap.

19 Claims, 6 Drawing Figures

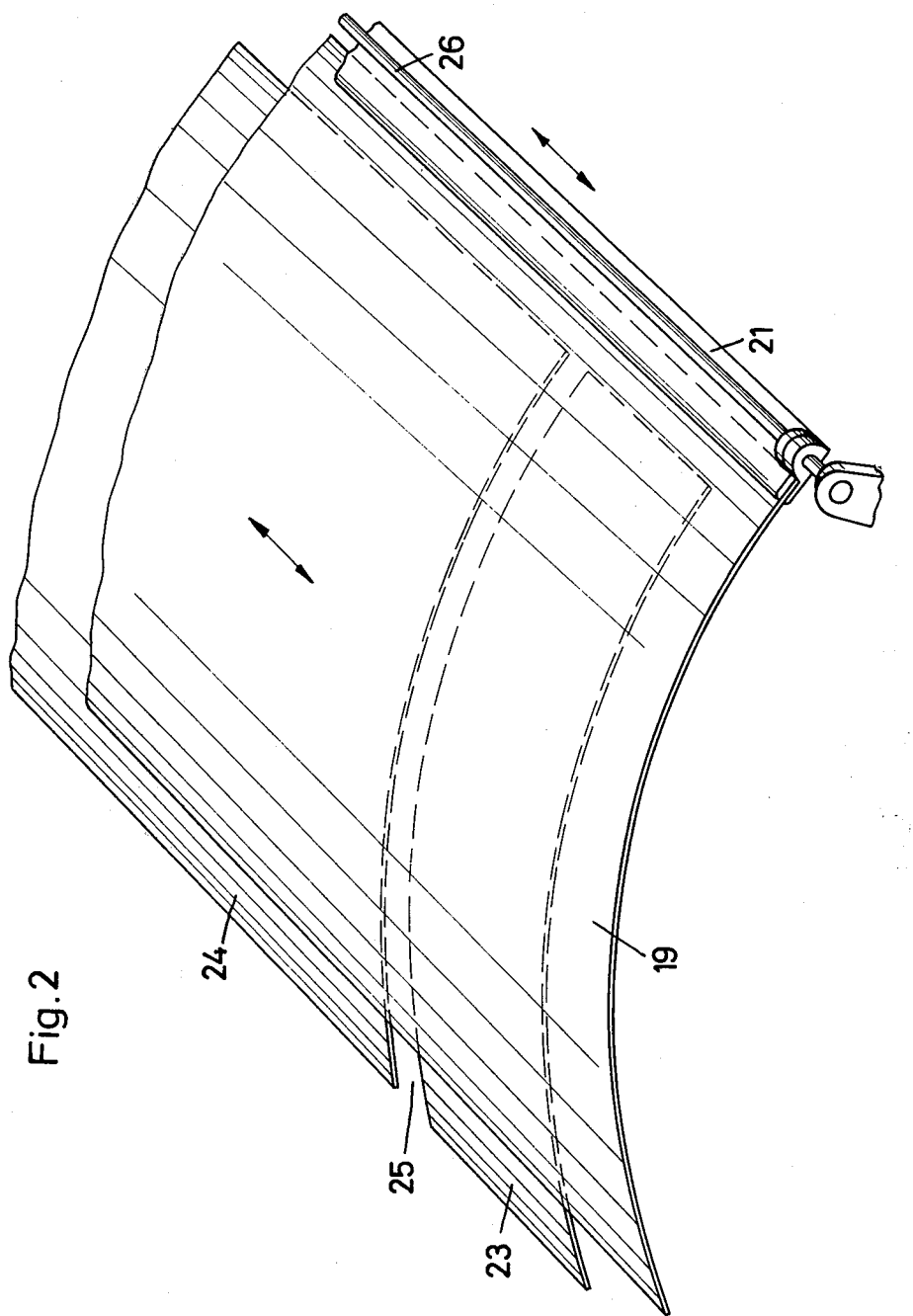

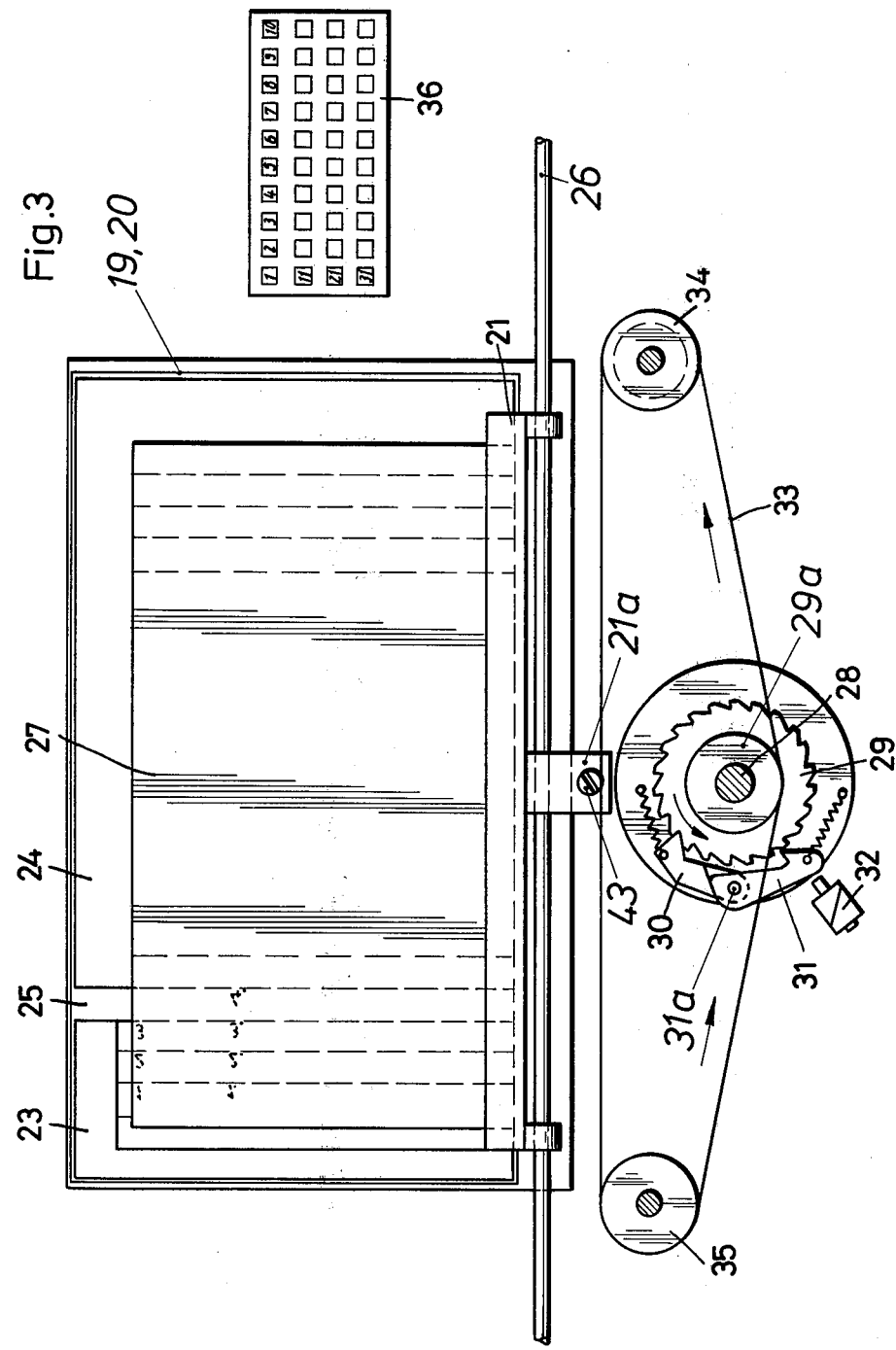

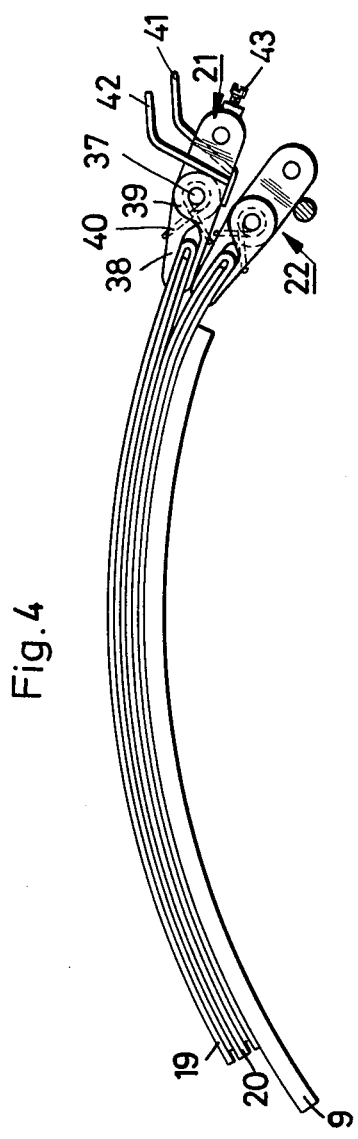

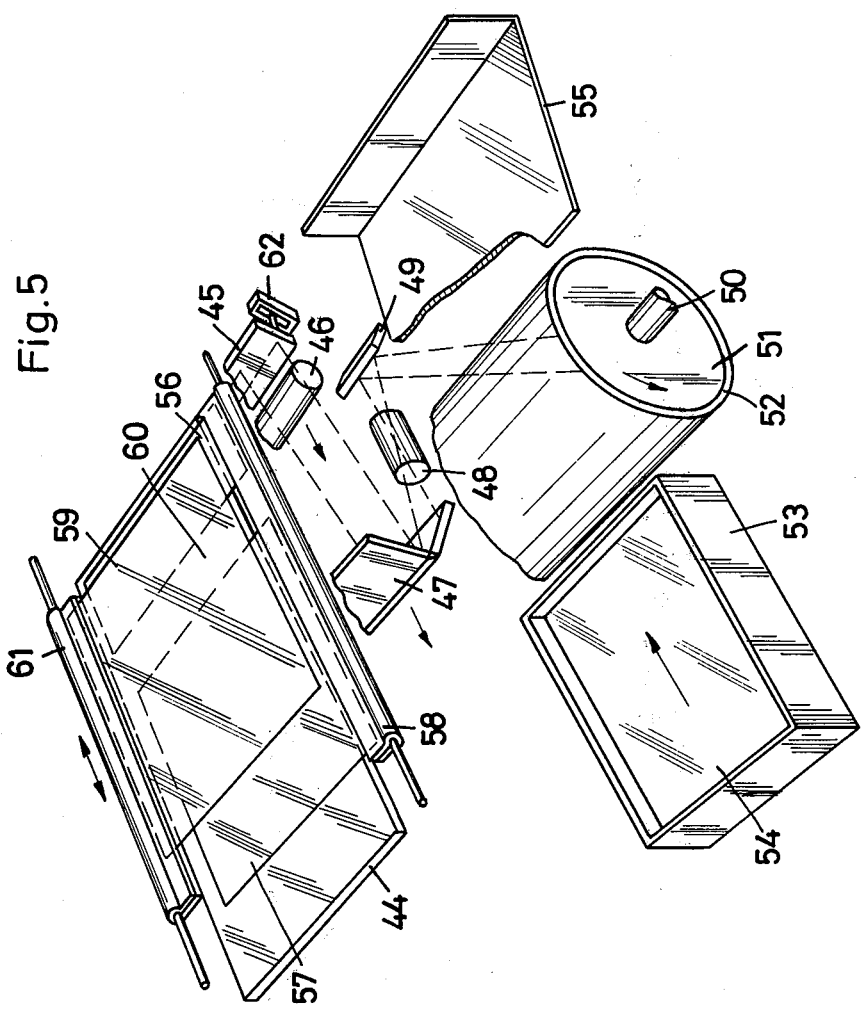

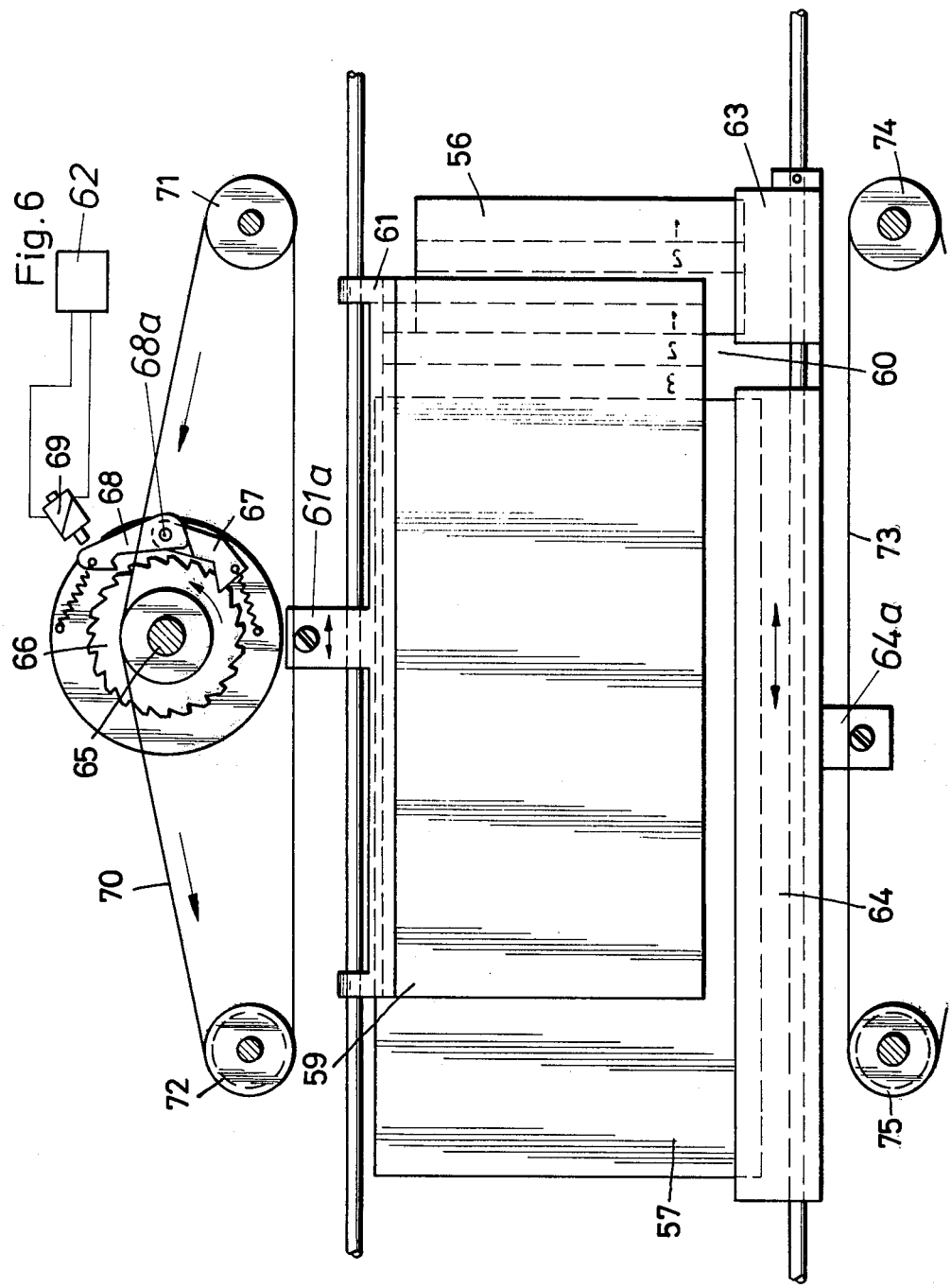

COPYING APPARATUS

BACKGROUND OF THE INVENTION

The present invention relates to copying apparatus in general, and in particular to an electrostatic or xerographic copying apparatus.

Copying apparatus of the type in question is in worldwise use and comprises a transparent support, for example a glass plate or the like, onto which the material to be copied is placed face down. In many instances it is desired not to copy the entire original, but only to copy selected portions thereof. For this purpose it is known in the prior art to provide an arrangement in which only portions of the rotating copying drum of the apparatus are electrostatically charged, so that the electric charges of these selected portions correspond to the parts of the original that are to be copied so as to copy only portions of an original.

However, this approach requires rather substantial changes in existing copying apparatus which is of the type constructed for copying only the original in its entirety. A conversion for copying only increments of the original involves such far-reaching changes in the construction and operation of such apparatus, that it is very expensive.

SUMMARY OF THE INVENTION

Accordingly, it is a general object of this invention to overcome the disadvantages of the prior art.

More particularly, it is an object of the invention to provide an arrangement which permits an existing copying apparatus of the type in question, which is inherently constructed only for copying an original in its entirety, to be converted without any difficulties and any substantial expense so that it can also be used for copying only incremental portions of an original.

In keeping with these objects, and with others which will become apparent hereafter, one feature of the invention resides in a copying apparatus of the type having a transparent support on which an original is placed face down so as to be copied through the support, in a combination comprising first means on the support and forming a slot-shaped opening, and second means on the first means adapted to hold an original and operative for advancing incrementally relative to the first means, so as to expose increments of the original in the slot-shaped opening.

Preferably, a first mounting device is provided extending along an of the original, for example a clamping device, which is capable of holding the second means directly or indirectly. The second means may be blank sheets, or they may be portions of a form which are to be copied, and whereon portions of the original held by the second means are to be copied together with the first means. The advancement of the second means can be effected stepwise by means of a stepping arrangement, for example a stepping motor or the like, and an automatic operation of the stepping arrangement by an increment can be effected after each copying cycle, for example by means of a contact timer or the like. In order to be able to select particular increments of the original held in the second means, a keyboard may be provided having keys each of which represents for example an increment or a line of the original in the second means, so that when the particular key is depressed that particular line or combination of lines will be selected for exposure in the slot-shaped opening.

The first means is advantageously of two parts, one of them being stationary and the other being adjustable with reference to this one part so that the width of the slot-shaped opening defined between them can be varied as desired.

The first means may comprise a transparent plastic envelope into which originals, forms or the like can be placed, and the same may be true of the second means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows in a detail view an arrangement for incrementally advancing the first or second means;

FIG. 3 is a top-plan view showing a stepping arrangement of the apparatus;

FIG. 4 shows clamping arrangements for the first and second means;

FIG. 5 is a diagrammatic view, illustrating in a simplified form a xerographic copying apparatus; and FIG. 6 is a detail view, showing an arrangement for effecting incremental advancement of portions of a similar apparatus to FIG. 5 which are provided according to the present invention.

DESCRIPTION OF THE PREFERRED EMBODIMENTS

Figure 1:
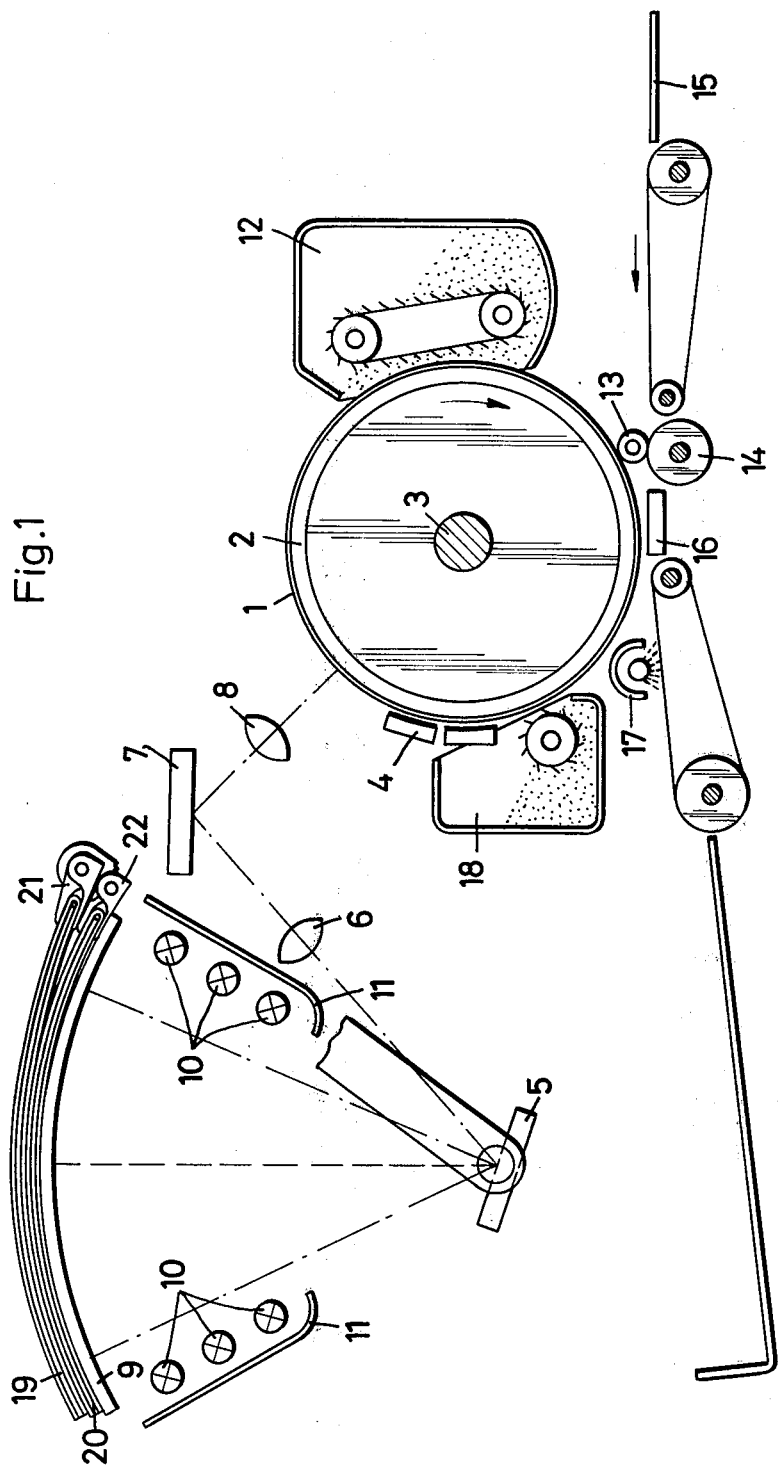
FIG. 1 is a diagrammatic side view of portions of a zerographic copier, which is shown in simplified form.

Referring firstly to FIGS. 1-4, which show one embodiment of the present invention, it will be seen that the xerographic copying apparatus shown in FIG. 1, which is conventional except for the details of the present invention, has a copying drum 2 provided with a light-sensitive layer 1; the drum 2 can be turned about the shaft 3 by a non-illustrated drive. Provided at the outer periphery of the drum, extending over the entire axial length thereof, is a charging arrangement 4 which serves to charge those portions of the layer 1 which travel past it. A tiltable mirror 5, a lens arrangement 6, a fixed mirror 7 and a further lens arrangement 8 are provided, by means of which a mirror image of an original placed upon a transparent support 9 is projected onto the layer 1. Lamps 10 are provided, and reflectors 11 which cooperate with them, to direct light against the originals on the support 9.

The tiltable mirror 5 is moved synchronously with the drum 2 and thus reflects those portions of the original which are not covered, onto the layer 1. The electric charges which have previously been applied to portions of the layer 1 by the device 4 are negated on those portions of the layer 1 which do not have parts of the original projected onto them, so that only at the remaining portions the charges will remain. During the further rotation of the drum 2 the thus-charged portions of the layer 1 move into the region of a powder applying device 12 which brings a powder in contact with the layer 1 so that the powder adheres to the layer 1, but only on those portions which are electrostatically charged. A copy sheet 15 is engaged by the rollers 13 and 14, and by means of a transfer device 16 the powder is transferred from the layer 1 to the sheet 15 on which it forms a replica of the original. The sheet 15 then travels through a fixing station in which the powder replica is fixed by means of an infrared radiator 17, and the copy is thus produced. The layer 1 has residual powder removed from it in a cleaning station 18 before it is recharged for producing the next copy.

According to the present invention, the material to be copied, identified with reference numerals 23 and 24 in FIG. 2, is placed in this embodiment into transparent plastic envelopes 19 and 20 so that those surfaces of the materials 23, 24 which are to be copied face towards the support 9. The envelopes 19 and 20 are mounted on clamping devices 21 and 22 which extend over the entire length of the support 9, along an edge thereof. However, the materials 23, 24 could also be mounted directly in the clamping devices 21 and 22, omitting the envelopes 19 and 20.

The arrangement of the materials 23 and 24 is clearly visible in FIG. 2. However, to keep the Figure from becoming unclear, the lower clamping device 22 and the envelope 20 held by it, as well as the original which is present in the upper envelope 19, have not been shown. Located in the envelope 20 of the lower clamping device 22, will be originals 23 and 24 (which are shown in FIG. 2) which form with one another a gap or slot-shaped opening 25 of a desired width. A portion of the original located in the upper envelope 19 will be visible through this gap 25 from below, i.e., through the support 9. The clamping device 21 can be shifted along a shaft 26 as indicated by the arrow, so that depending upon the position of the clamping device 21 different portions or increments of the upper original which is located in the envelope 19 will be visible through the slot 25 and can therefore be copied onto the layer 1.

It is, for example, often necessary to copy a form which has a head portion that remains unchanged, but wherein different additional portions must be copied along with the head portions, and these different additional portions may vary from copy to copy. In the context of the invention as illustrated, it may be assumed that the original 23 contains the information provided for the head portion, whereas the original which moves with the upper clamping device 21 contains the varying items of information that are to be included in the head portion and which may vary from copy to copy. The original 24 may be nothing more than a blank sheet, but of course it may also carry its own separate information if desired.

It will be appreciated that the arrangement of the present invention makes it possible to make copies composed of a standard picture, a set of items, writings or the like, and wherein items which vary from copy to copy can be included merely by shifting the original in the upper envelope relative to the gap so that different portions of the original in the upper envelope 19 become exposed in the gap. Moreover, the apparatus of the present invention makes it possible to carry out such operations on a conventional electrostatic or xerographic copying machine without having to effect any significant changes in the machine, and thus without incurring additional expenses. If special copies are to be produced which in addition to the information of the head part provided on the original 23 also have to include all or a large part of the original in the envelope 19, then it is merely necessary to remove the original 24. FIG. 3 shows an arrangement for incremental shifting of the upper clamping device 21 with its associated envelope 19 and an original 27 located therein. A known stepping arrangement is provided which has a toothed wheel 29 that can turn about a shaft 28 and is biassed by a non-illustrated spring to turn in the direction of the arrow. A pawl 30 is provided, as well as an actuating pawl 31; these are jointly pivoted at 31a. By monentary excitation of an electromagnet 32, which acts upon the pawl 31, and via the same upon the pawl 30, the wheel 29 is turned by the spring (see the arrow) through a distance which is determined by the number of teeth on the wheel. The wheel has a hub 29a with which the clamping device 21 is connected via a rope, wire or the like 33 that is trained about rollers 34 and 35. The rope or wire is connected to a member 21a which is fastened to the device 21 or is a part thereof, so that each brief excitation of the electromagnet 32 causes the device 21 and therefore the upper original 27 to be shifted through a certain increment, for example through the distance of one line of printing to another. The individual lines of the original 27 have buttons of a keyboard 36 associated with them, so that when a particular button is pushed, the electromagnet 32 is excited by an electric circuit a number of times corresponding to the number on the button, until the original 27 assumes the desired position. The spring, which expends energy in response to the stepwise turning of the wheel 29, is tensioned again by the rope 33 and the rollers 34, 35 and a drive (not shown) which can be coupled with the roller 34. In so doing, the original 27 is returned to its starting position. In place of the embodiment illustrated in FIG. 3, an appropriately controlled stepping motor can be used.

It is frequently desired that the variable data which are included in successive copies be taken from successive lines of an original, such as the original 27. In such a case automatic advancement of the original by one or more lines after each copy cycle is desired. This can be effected in known manner by means of a contact timer which is provided with a turnable contact arm and which controls the electromagnet 32.

It is also possible, according to the present invention, to construct the lower clamping device 22 so that it is of two parts, the originals 23 and 24 having thus separate clamping devices. It may be shiftable lengthwise of its longitudinal axis, with reference to the clamping device for the other original 23, so that the width of the gap 25 can be selected at will, or the gap can even be completely closed. This is a simple manner of determining in advance the number of lines or the size of increments of the original 27 which are to be exposed in the gap 25. Any desired stepping arrangement, for example the type described with respect to FIG. 3, can be used for the shifting of the original 24 and the associated part of the clamping device.

The clamping devices 21 and 22 may be of the type which is explained and shown in detail with reference to FIG. 4. As shown there, the clamping device 21, which is also representative of the device 22, has two parts or jaws 38 and 39 which are connected so that they can tilt relative to one another about a shaft 37. The ends facing the originals or the envelopes in which the originals are received, are pushed together by a spring 40. Manually operable levers 41 and 42 are provided, each connected with one of the parts 38 and 39, to permit the jaws to be opened counter to the force of the spring 40, to thus make possible a simple replacement of the transparent envelopes and/or the originals. A screw 43 serves to effect axial shifting of the clamping device.

It is also desirable in some instances, as indicated earlier, that the original to be incrementally exposed in the gap between the two lower originals, be advanced automatically in response to each copying cycle of the apparatus. This can be triggered by a movable component of the apparatus which performs identical movements during each copying cycle, for example the copying drum or one of the movable mirrors. The automatic advancement can be effected by means of electromagnets or by means of a stepping motor.

Such embodiments are illustrated in FIGS. 5 and 6, where it will be seen that beneath the transparent support which is identified with reference numeral 44 in FIG. 5, there is provided a mirror 45 which is movable parallel to the support 44 during a copy cycle, that is during the making of a single copy. The mirror 45 has fixedly mounted for movement with it a light source 46, and there is provided an also horizontally shiftable double mirror 47 which twice reflects the image coming from the mirror 45 and whose movement is coupled with that of the mirror 45. A lens arrangement 48 is also provided, as well as a further mirror 49 which projects the image of the original or originals located on the transparent support 44, upon a portion of the light-sensitive layer 52 that is provided on the drum 51 which turns in counterclockwise direction on a shaft 50.

A container 53 contains copy papers 54 in a stack, and these are moved beneath the drum 51 individually in a manner known from the art, coming in contact with the layer 52 and thereupon being transported to a tray 55, also in known manner. During the contact the powder from the layer 52 is transferred to the copy paper 54 to form the copy image thereon. The means for producing the copy image are not illustrated in this Figure, but they have been shown in FIG. 1 and are in any case completely conventional.

Located on the transparent support 42, if desired in a transparent envelope, is a first original 56 which contains the head information, i.e. the information that remains unchanged from copy to copy. There is further provided an original 57, and both of these are held by a stationary clamping device 58. They form with one another a gap or slot-shaped opening 60 which extends parallel to the lines of information on the original 56 and to the lines of an original 59 which overlies the original 56 and the original 57. Thus, one or more lines of the original 56 will always be visible in the gap 60. The original 56 is engaged directly by a clamping device 61, or indirectly in that it may be located in a transparent plastic envelope. The clamping device 61 is elongated in the direction of travel of the copying papers 54 and can be shifted in this direction in mutually opposite sense, as indicated by the double-headed arrow, so that any desired increments of the original 59 can be placed in registry with the gap 60. This makes it possible to copy any increments of the original 59 in the gap 60.

According to the invention, the original 59 is to be automatically advanced in dependence upon the number of copying cycles that are to be carried out. For this purpose, a switch 62 is provided which is briefly activated whenever the mirror 54 returns after a single copy cycle to its starting position. However, in place of the switch 62 it is also possible to use a switch that is actuated by a cam provided on the drum 51 and rotating with the same. In any case, however, the switch 62 or the equivalent thereof controls the displacement of the clamping device 61, so that after each copying cycle the device 61 and thus the original 59 can be moved through a predetermined distance corresponding, for example, to the distance between successive lines of printing on the original 59, or to the distance between any desired number of lines of printing. The shifting of the systems takes place automatically upon completion of every copying cycle and thus successive copying papers are provided with different increments of the printing or other material that is carried on the original 59.

In place of the parallelism of the clamping devices for the originals 56–57 on the one hand and the original 59 on the other hand, it is also possible to have the clamping devices extend normal to one another.

FIG. 6 shows a top-plan view of the original 59 with its movable clamping device 61, as well as of the originals 56 and 57. Contrary to FIG. 5, the originals 56 and 57 are not held in a joint fixedly mounted clamping device, but held in separate clamping devices 63 and 64, respectively. The clamping device 63 for the original 56 carrying the head information is fixedly mounted; the clamping device 64 for the original 57, however, is shiftable in the same direction as the clamping device 61, as indicated by the arrow. This makes it possible to vary the width of the gap 60 and thus to predetermine in advance the number of lines to be copied in the gap 60 from the original 59 together with the information on the original 56.

The incremental advancement of the clamping device 61 is again effected by means of a known stepping arrangement which has a toothed wheel 66 that can turn on a shaft 65 and which is urged in one direction by a not-illustrated spring. A blocking pawl 67 and a switching pawl 68 are provided, which are pivoted together at 68a. An electromagnet 69 acts on the pawls 67 and 68 and, when briefly energized or excited, permits the wheel 66 to be turned by the spring through a distance which is determined by the number of teeth on the wheel. The clamping device 61 is connected with the wheel 66 via a rope, wire or the like 70 which is trained about rollers 71 and 72 and connected to a member 61a of the device 61. Brief energization of the electromagnet 69 thus causes the original 59 to be shifted relative to the originals 56 and 57, for example by an increment corresponding to the distance from one to the next line of the original 59. The electromagnet 69 is energized via the switch 62 shown in FIG. 5. It is preferable, however, to control the energization of the electromagnet 69 in such a manner that it can be effected not only via the switch 62, but that it is possible to override the switch 62 and to energize the electromagnet selectively and at will, for example by means of push-buttons or the like.

The spring, which expends energy as the wheel 66 turns, is tightened again by a drive which can be coupled with the roller 72; at this time, the original 59 is also returned to its starting position. The arrangement in FIG. 6 can also be replaced by an appropriately controlled stepping motor.

The shifting of the clamping device 64 can be effected by a device similar to the one illustrated in FIG. 6; by way of example, a rope or wire 73 and two rollers 74 and 75 of such a device have been illustrated, the rope 73 being connected with the clamping device 64 via an element 64a. The displacement of the clamping device 64 is effected independently of the number of copying operations being carried out, and can be controlled manually, for example by means of push-buttons or the like.

It will be understood that each of the elements described above, or two or more together, may also find a useful application in other types of constructions differing from the types described above.

While the invention has been illustrated and described as embodied in a copying apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a copying apparatus, an arrangement for forming images including portions of original documents each of which has a plurality of such portions spaced from one another in a given direction and each having a different set of indicia thereon, said arrangement comprising, in combination, masking means at the apparatus and having at least one opening and indicia on said masking means which are to be correlated with said sets of indicia to form said images; means for supporting a respective original document behind said masking means as considered from the apparatus; and means for exposing a selected one of said portions in said opening for copying by the apparatus of an image composed of said masking means and the respective set of indicia on said selected portion of the respective original document, including means for transporting said supporting and masking means relative to one another in a path coincident with said given direction and operative for bringing each respective set of indicia of the respective original document in correlation with the indicia on said masking means for joint copying by the apparatus.

2. A combination as defined in claim 1, wherein the apparatus includes a transparent support adapted to support the original document for copying of the latter by the apparatus, and having an edge; and wherein said displacing means is operative for transporting the original document relative to said masking means in direction of said edge.

3. A combination as defined in claim 2 and further comprising holding means extending along said edge for holding said masking means in position relative to said support.

4. A combination as defined in claim 2, said supporting means extending along said edge.

5. A combination as defined in claim 2, said transporting means comprising a stepped drive for incrementally advancing said supporting means.

6. A combination as defined in claim 5, said stepped drive comprising means for actuating the same in automatic sequence and for a duration corresponding to a desired increment of advancement.

7. A combination as defined in claim 2, said transporting means comprising a drive for incrementally advancing said supporting means; and keyboard means operatively connected with said drive for selecting different increments of advancement in dependence upon depressing of different buttons of said keyboard means.

8. A combination as defined in claim 2, said masking means being in two parts which form with one another said opening; and further comprising holding means extending along said edge for holding said masking means, said holding means including a stationary first element and a second element which is incrementally shiftable relative to said first element for varying the size of said opening.

9. A combination as defined in claim 8; and further comprising stepped drive means for shifting said second element relative to said first element.

10. A combination as defined in claim 2, wherein said supporting and masking means each comprise a transparent plastic folder adapted to accommodate an original.

11. A combination as defined in claim 3, said supporting and holding means directly mounting said document and masking means, respectively.

12. A combination as defined in claim 3, said supporting and holding means comprising respective clamping devices each composed of two jaws which are biased together and can be pivoted apart by exertion of pressure on engaging portions on the respective jaws.

13. A combination as defined in claim 2, said apparatus including an element which performs an identical movement during each copying cycle of said apparatus; and wherein said means transporting is operatively connected with said element to be triggered by the same during each movement thereof.

14. A combination as defined in claim 2, wherein said means transporting comprises electromagnetic means.

15. A combination as defined in claim 2, wherein said means transporting comprises a stepping motor.

16. A combination as defined in claim 3, wherein said supporting means extends parallel to said holding means.

17. A combination as defined in claim 16, wherein said supporting and holding means extend along parallel but transversely spaced edges of said support.

18. A combination as defined in claim 3, both of said supporting and holding means being elongated, and said supporting means extending transverse to the elongation of said holding means.

19. A combination as defined in claim 8, wherein the second element is selectively incrementally shiftable independently of other operations of said apparatus.

* * * * *